United States Patent
Huxel

(10) Patent No.: US 7,179,497 B2
(45) Date of Patent: *Feb. 20, 2007

(54) COATED PELLETIZED SHORTENING

(75) Inventor: Edward T. Huxel, Ft. Worth, TX (US)

(73) Assignee: Cargill, Inc., Wayzata, MN (US)

( * ) Notice: Subject to any disclaimer, the term of this patent is extended or adjusted under 35 U.S.C. 154(b) by 484 days.

This patent is subject to a terminal disclaimer.

(21) Appl. No.: 10/387,768

(22) Filed: Mar. 13, 2003

(65) Prior Publication Data

US 2004/0001908 A1  Jan. 1, 2004

Related U.S. Application Data

(60) Provisional application No. 60/364,861, filed on Mar. 13, 2002.

(51) Int. Cl.
*A23D 9/00* (2006.01)

(52) U.S. Cl. .......................... 426/98; 426/99; 426/307
(58) Field of Classification Search .................... None
See application file for complete search history.

(56) References Cited

U.S. PATENT DOCUMENTS

| 5,866,187 A | 2/1999 | Kincs et al. |
| 6,054,167 A | 4/2000 | Kincs et al. |
| 6,932,996 B2 * | 8/2005 | Huxel .................... 426/291 |

* cited by examiner

*Primary Examiner*—Carolyn Paden
(74) *Attorney, Agent, or Firm*—Shughart Thomson & Kilroy PC

(57) ABSTRACT

A process and device is provided for coating a formed rod or pellet of shortening with a layer of shortening having a higher melting point to prevent agglomeration of the shortening pellets during storage and transportation.

18 Claims, 6 Drawing Sheets

COATED PELLETIZED SHORTENING

CROSS REFERENCE TO RELATED APPLICATION

This application claims benefit of U.S. Provisional Application Ser. No. 60/364,861 filed Mar. 13, 2002.

STATEMENT REGARDING FEDERALLY SPONSORED RESEARCH

Not relevant.

FIELD OF THE INVENTION

The invention relates to preparation of shortening. In particular the preparation of a coated shortening pellet wherein a coating of a high melting point shortening is added to a pellet of a lower melting point shortening after extrusion of the pellet. The high melting point coating resists softening at temperatures commonly associated with the shipping and storage of shortening and thereby prevents agglomeration of the shortening pellets during shipping and storage.

BACKGROUND OF THE INVENTION

This invention generally relates to shortening in the form of solids such as pellets or chunks. The shortening is primarily vegetable oil or low-fat or fat substitute, or combination thereof, in a solid form suitable for uses requiring a non-liquid which is still able to be poured or metered. More particularly, the invention relates to pelletized shortening and the like which is coated to resist clumping under room temperature conditions and the higher temperatures which are commonly associated with shipping and storage of the shortening.

The formation of shortening pellets is known and their formation by extrusion of a flow of solidified shortening through extrusion orifices which impart a desired pellet size and shape is described and discussed in U.S. Pat. No. 5,866,187 and U.S. Pat. No. 6,054,167 to Kincs et al., the specifications of which are incorporated herein by reference.

SUMMARY OF THE INVENTION

The inventive method comprises forming a coated pelletized shortening or fat by coating a second liquid vegetable oil or fat, on to a rod or pellet of solid vegetable oil or fat as it exits the extrusion head of a pellet forming device. The liquid coating will form a layer over a first solid vegetable oil or fat. This is accomplished by adding the liquid second fat onto the pelletized solid. The preferred liquid fat or vegetable oil will have a melting point of greater than 120° F. The fat coating is then allowed to form its solid phase about the first, extruded solid oil or fat. The coating, due to its higher melting point, is better able to resist softening or melting than is the first solid oil or fat when both are exposed to temperatures above 70 degrees Fahrenheit. In this manner a solid pellet exterior surface is presented at higher temperatures and agglomeration of the pellets when exposed to the higher temperatures is avoided.

The objective is to produce a pelletized shortening that resists clumping together or agglomeration at a temperature of at least 85 degrees Fahrenheit while having a minimum solid fat index similar to that of all purpose shortening, frying shortening, margarine, lard, etc.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENT

As required, detailed embodiments of the present inventions are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
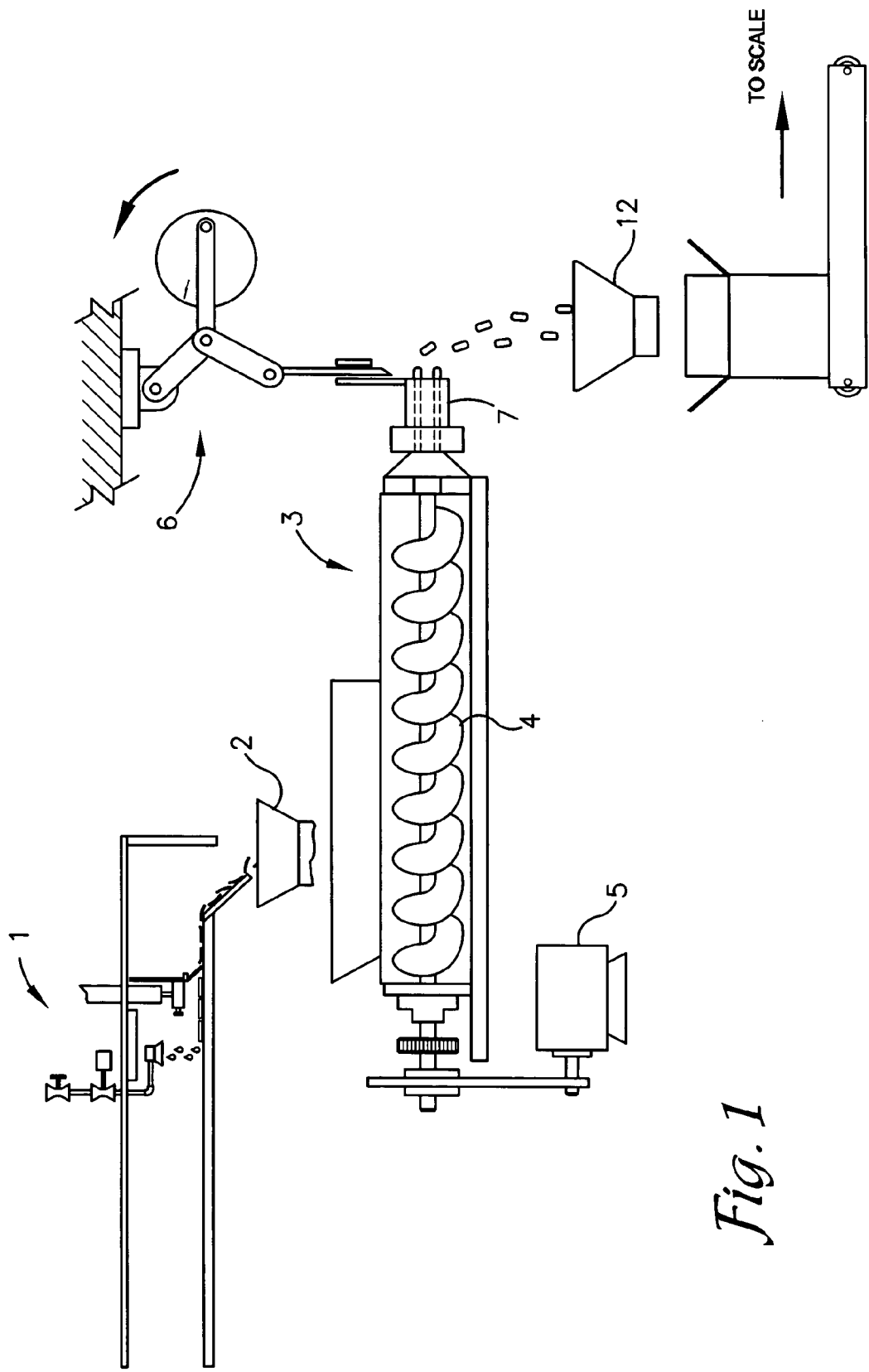
FIG. 1 is a generally schematic elevational view of a preferred embodiment of an apparatus for carrying out the process.

The apparatus illustrated in FIG. 1 includes a device 1 for crystallizing a molten shortening. The flat plate flaker is the preferred method for shortenings having a melting point below approximately 120 degrees Fahrenheit and/or a minimum SFI of 19 percent at 21.1 degrees Celsius/70.0 degrees Fahrenheit and a maximum SFI of 16 at 40.0 degrees Celsius/104.0 degrees Fahrenheit. Other typical devices that can be used are a scraper surface heat exchanger, and/or agitator unit, and a static hold unit with pelletizing holes, or a chill roller that are commonly used in the shortening industry. The solid shortening is collected in a hopper 2 which directs the solid shortening into the screw auger 3. The augers 4 push the solidified flakes or shortening toward extrusion head 7 creating a pressurized flow. The feed rate and pressure generated at the extrusion head 7 are adjusted by controlling the rotation speed of the augers. A variable speed controlled electric motor 5 is used for this purpose. To give uniform pellet lengths, a guillotine cutter 6 is provided to cut the extruded shape. The cut pellets fall into a filling hopper 12 for loading a shipping container.

Figure 2:
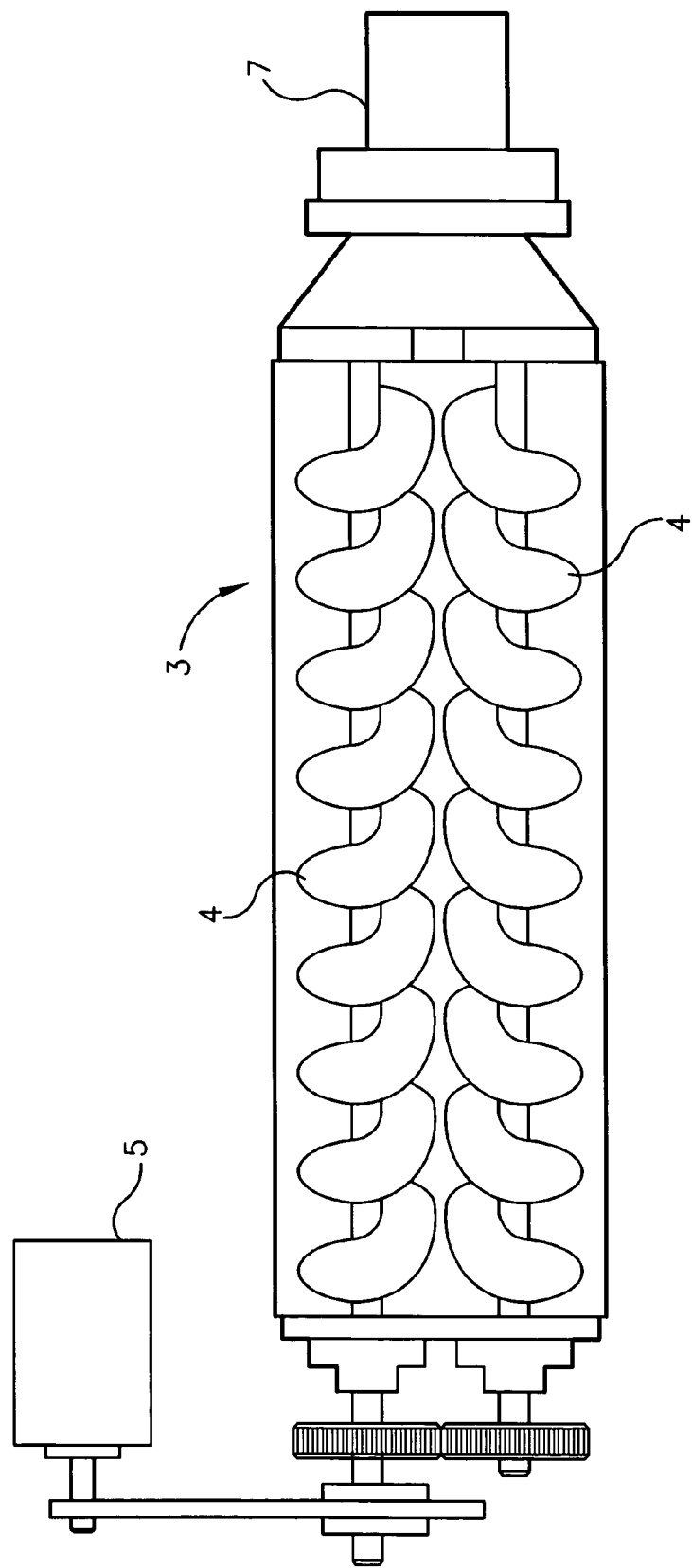
FIG. 2 is a top view of screw angle feed system.
Figure 3:
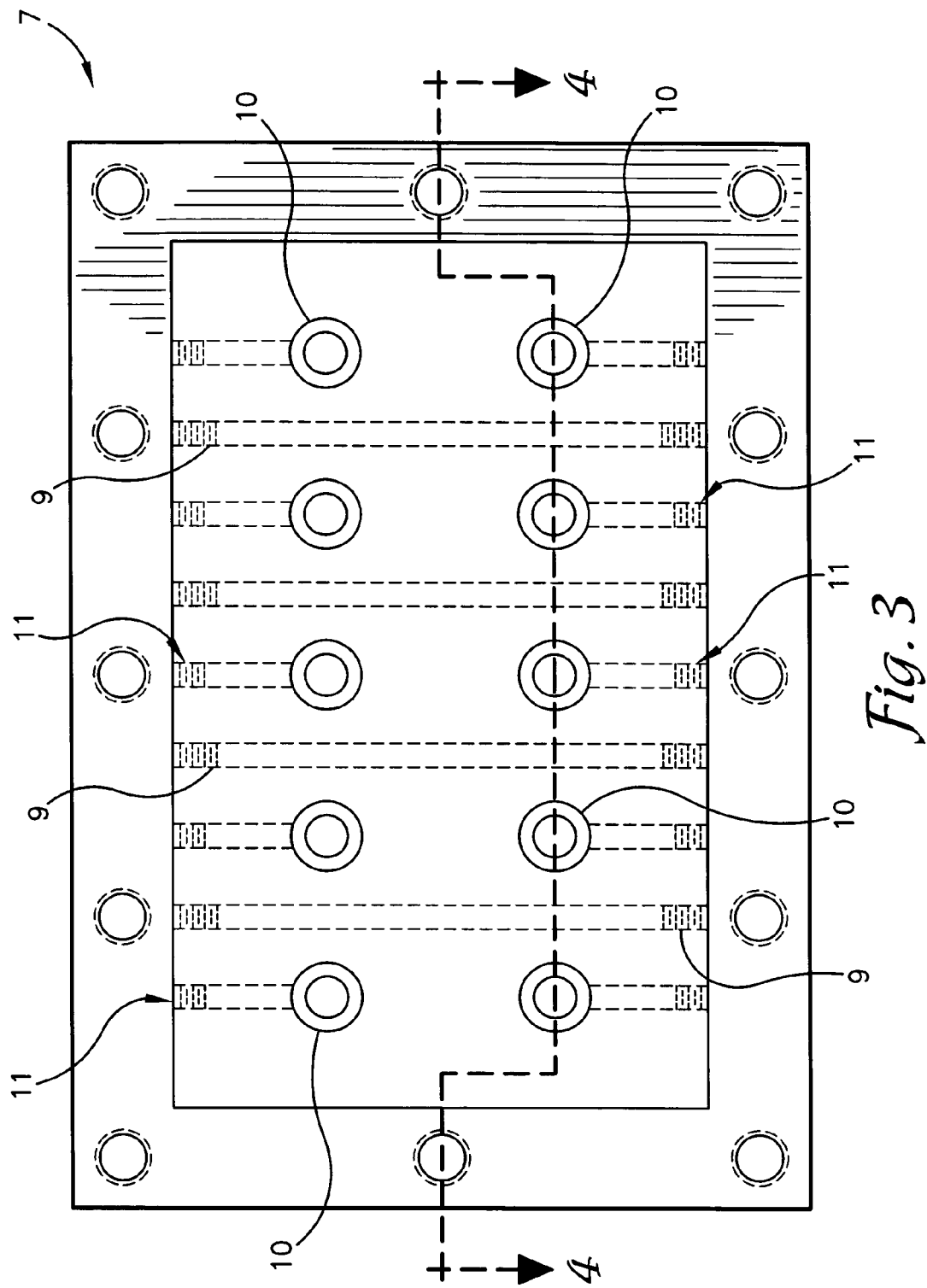
FIG. 3 is a front view of extrusion head.
Figure 4:
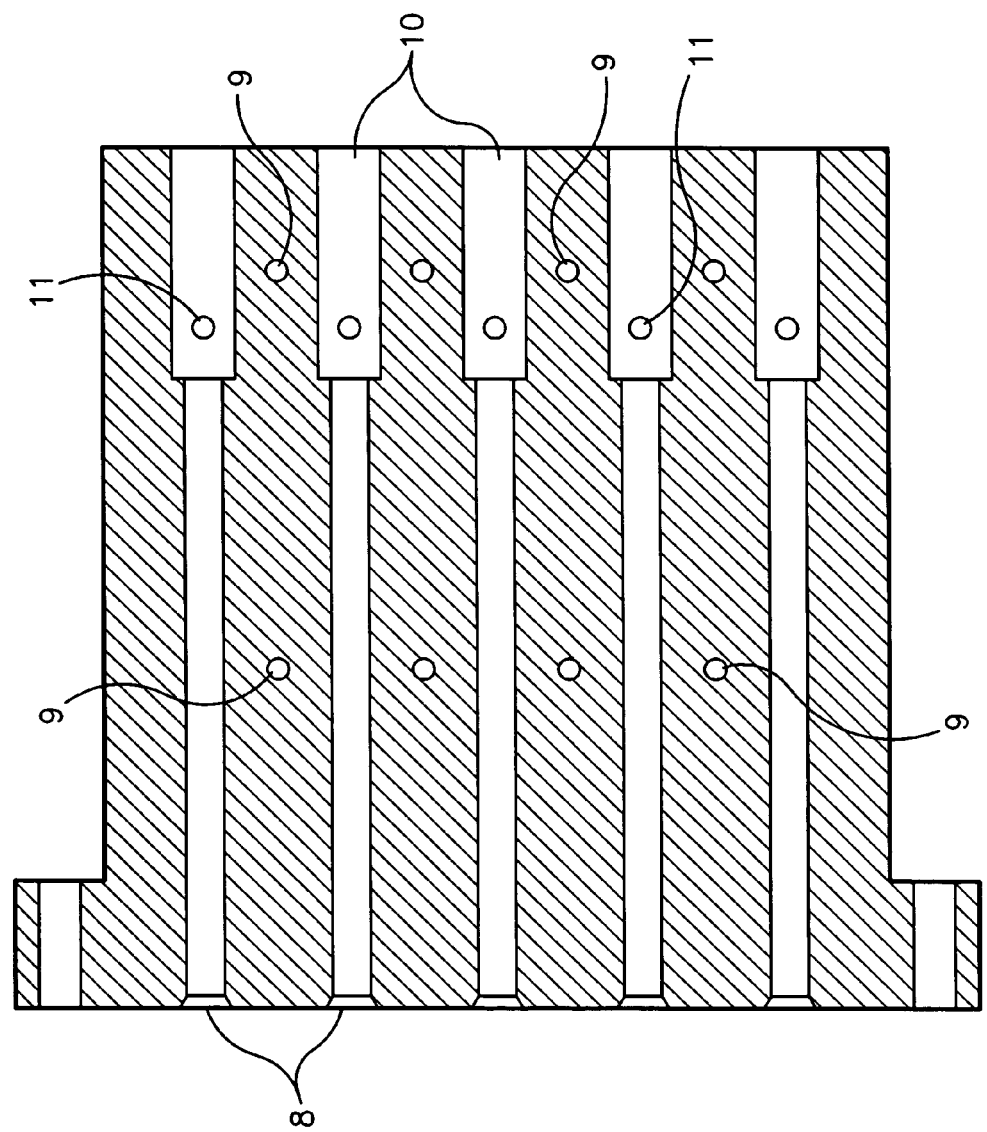
FIG. 4 is a cross sectional view of extension head.

The coating is added to the extruded shortening near the exit side of voids or holes 8 of extrusion head 7 as the formed rod of shortening enters counter bored voids or holes 10. FIG. 3 and FIG. 4 show the features of the extrusion head. The solid shortening is forced into extrusion head 7 by augers 4 (FIG. 2). Extrusion head 7 is slightly warmed by circulating heated water through holes 9 in head 7. The water is heated to approximately 10 degrees to 15 degrees Fahrenheit below the melting point of the first solid oil or shortening. The warm surface melts the lower melting point fat fractions in the outer surface of the first shortening as it passes through voids or holes 8 to provide a liquid, lubricating layer or oil for the solid shortening. The extrusion holes 8 (FIG. 4) extend through head 7 and into a larger, concentric counter bored voids or holes 10. The counter bored holes 10 have a diameter approximately 0.002 inches to 0.004 larger than extrusion voids or holes 8.

A second, different shortening having a melting point of at least 125 degrees Fahrenheit is pumped through holes 11 drilled into the counter bored holes 10. The second fat or shortening is pumped at a sufficient flow rate to coat the outside layer of the just formed shortening rods prior to being cut into pellets. The coating does not need to coat the outside completely, but coat sufficiently to prevent clumping of the formed pellets when the finished product is exposed to 85 degrees Fahrenheit storage temperature.

Figure 5:
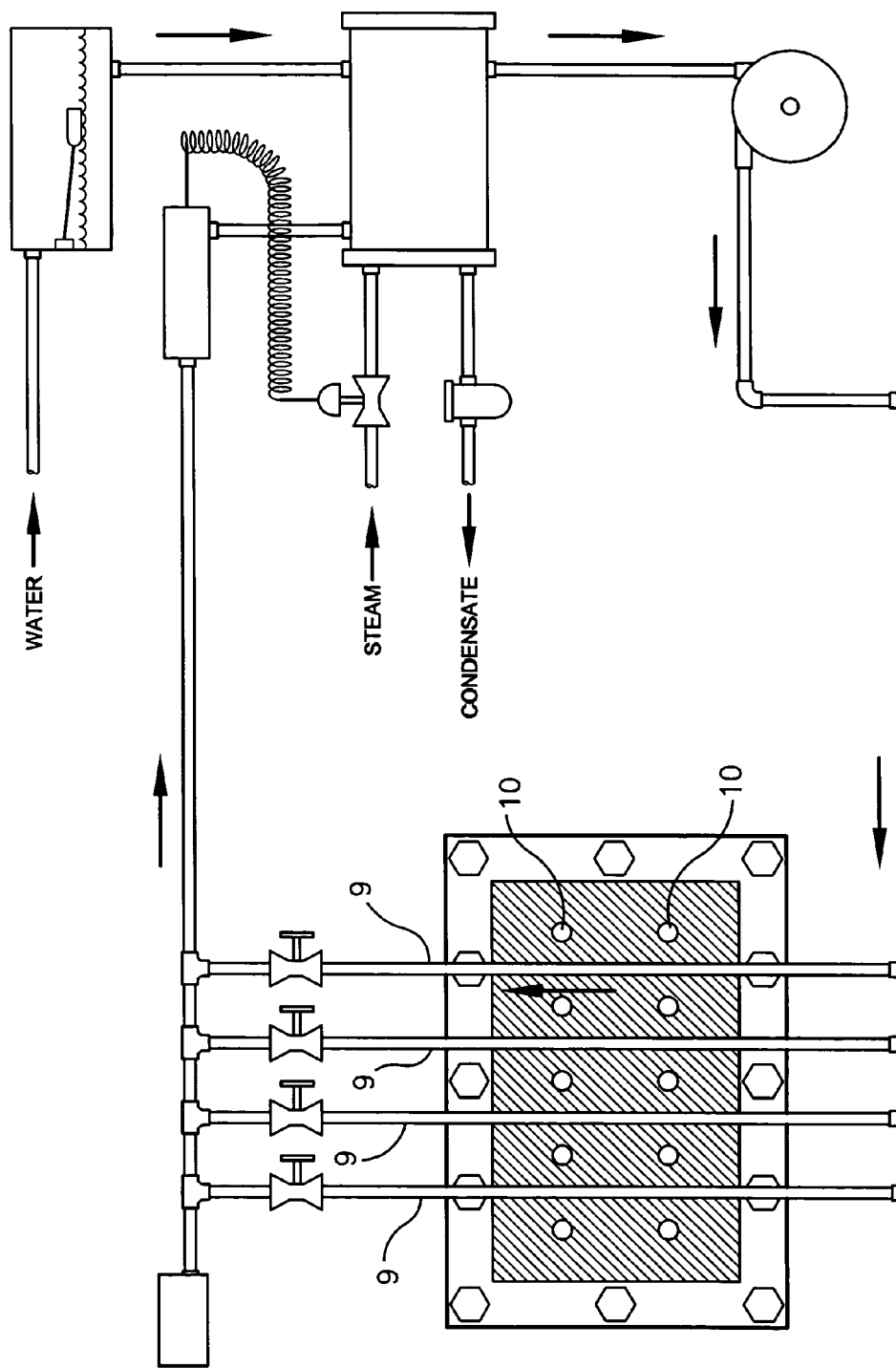
FIG. 5 is a warm water recirculation system for heating block.
Figure 6:
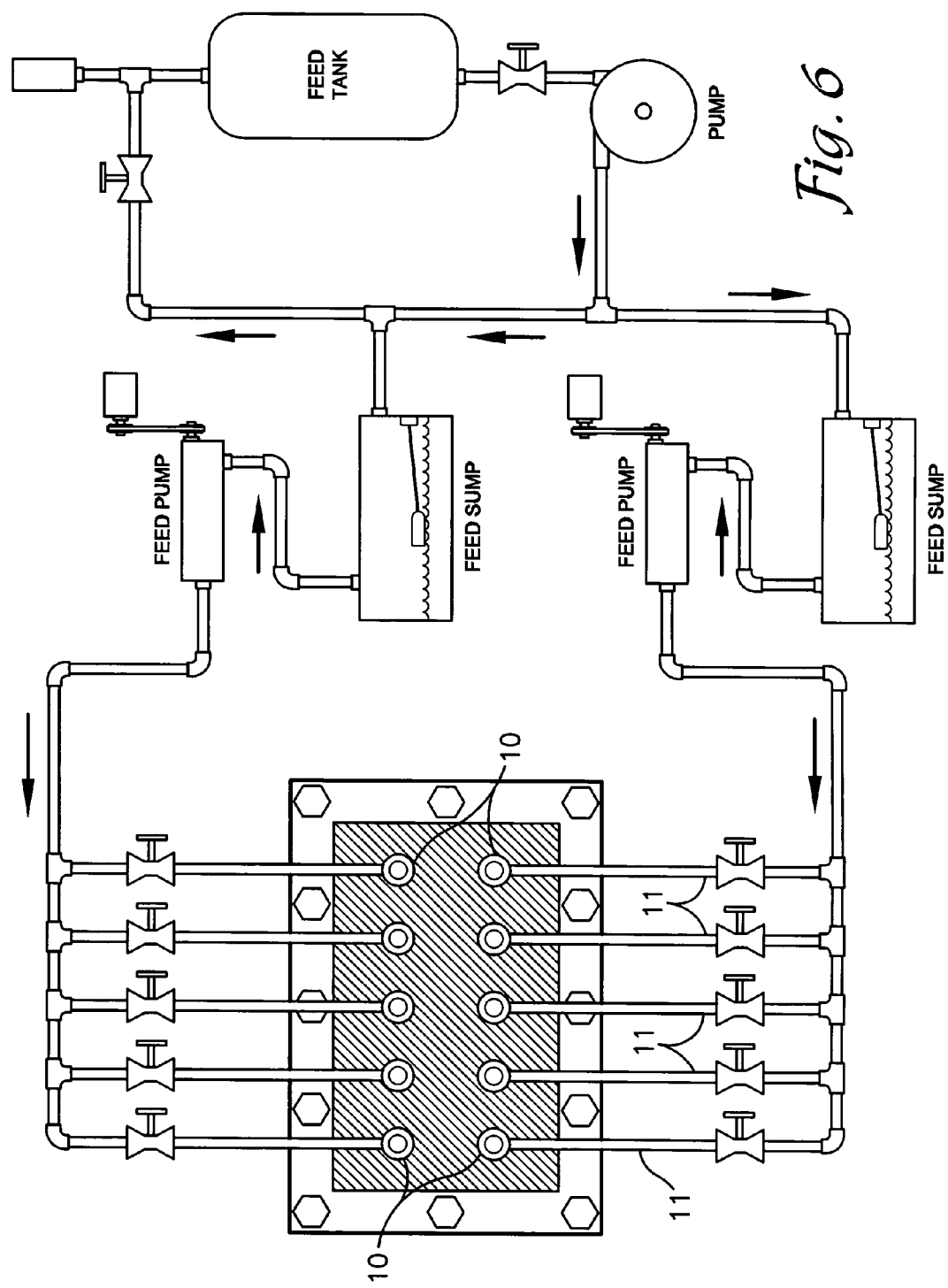
FIG. 6 is a liquid feed system to feed coating oil/fat to extrusion head.

FIG. 5 shows a system for pumping heated water through the block using a shell and tube heat exchanger. In FIG. 6, the second shortening application system is shown. The second, melted shortening is pumped through voids or holes 11 entering the counter bored voids or holes 10 of extrusion tube 8. A variable speed triplex piston pump is used to pump the second, coating shortening.

Pilot plant trials were done on the products shown in Table 1. The SFI, specifications and melting points for each product are listed. The three different products of Table 1 were flaked on the flat plate flaker at temperatures below 50 degrees Fahrenheit and pressed through the previously described extrusion head 7. As the rods of solid shortening entered counter bored void or tube 10, a second, liquid oil of molten soybean sterate (M.P. 135° Fahrenheit, 4 iodine value(I.V.)) was pumped into the enlarged space created by the increased diameter of counter bored void or hole 10. The second shortening coated the formed rods of shortening exiting from extrusion voids 8 and formed a layer on the rods which solidified rapidly. The layer consistently covered approximately 75 percent of the outside layer of the pellet cylinder wall. The coating shortenings had β-carotene added at a high level for color contrast.

To simulate shipping, storage and distribution fluctuations, storage tests were conducted on each item from Table I. Table II lists the operating parameters and results for each shortening. Each shortening was placed into a 6.5 inch by 6.5 inch by 12 inch high carton box. Nine pounds of coated pellets were filled into each carton box. These boxes were prepared for each item. Each box was initially maintained at 45 degrees Fahrenheit for 48 hours. After the initial storage, one box of each item was stored at 70 degrees Fahrenheit, 85 degrees Fahrenheit and 100 degrees Fahrenheit for 24 hours. After the 24 hours elapsed, the boxes were returned to the 45 degree Fahrenheit storage room for 24 hours to return the mass to the original 48–50 degrees Fahrenheit. After the third storage period, the entire contents of the box were dumped onto a tray and gently raked with a fork. All agglomerated or clumped pellets were weighed. A control sample was also run on the all purpose vegetable shortening without the second shortening coating.

In Table III, the results are listed for the storage tests. The control had a considerable amount of clumping in comparison to the other items. Coating the pellet with a higher melting point shortening reduces significantly the clumping when the products are subjected to higher storage conditions.

TABLE I

DESCRIPTION OF PELLETIZED SHORTENINGS

| Description | SFI-% SOLIDS Degrees Fahrenheit | | | | | | METTLER MELTING POINT (° F.) |
|---|---|---|---|---|---|---|---|
| | 50 | 70 | 80 | 90 | 100 | 104 | |
| All Purpose Shortening Vegetable Oil Base | 23 | 19 | — | 14 | — | 11 | 102 |
| Baker Grade Margarine Vegetable Oil Base | 28 | 21 | 18 | 16 | — | 10 | 108 |
| Vegetable Frying Shortening | 49 | 85 | 29 | 13 | 4 | 1 | 105 |

TABLE II

RESULTS AND PARAMETERS FOR PILOT PLANT

| Item | Flake of Temp ° F. | Extrusion Head Temp | Diameter of Pellet ( ) | Average Length | % Coverage |
|---|---|---|---|---|---|
| All Purpose Vegetable Shortening | 42° F. | 90° F. | .496" | 1.32" | 87 |
| Baker Grade Margarine Vegetable Oil Base | 39° F. | 92° F. | .503" | 1.27" | 92 |
| Vegetable Frying Shortening | 41° F. | 95° F. | .493" | 1.56 | 94 |
| All Purpose Vegetable Shortening Control | 41° F. | 90° | .492" | 1.38 | 0 |

TABLE III

RESULTS FROM STORAGE TESTS

| Item Description | Clumping % by Weight and by Storage Temperature | | |
|---|---|---|---|
| | % ° F. | 85° F. | 100° F. |
| All Purpose Vegetable Shortening | 2% | 4% | 12% |
| Bakers Grade Margarine Vegetable Oil Base | 4% | 4% | 6% |
| Vegetable Frying Shortening | 0% | 3% | 8% |
| All Purpose Vegetable Shortening Control | 22% | 48% | 76% |

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive device and method for coating shortening pellets are constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

The invention claimed is:

1. A vegetable oil or shortening solid pellet comprising:
   a first solid vegetable oil or shortening layer having a first melting point, and
   a second solid vegetable oil or shortening layer substantially coating said first layer,
      said second layer having a melting point higher than said first melting point.

2. The pellet as claimed in claim 1 wherein said second layer comprises a melting point of between 95 to 120 degrees Fahrenheit.

3. The pellet as claimed in claim 1 wherein said second layer comprises a melting point of greater than 120 degrees Fahrenheit.

4. The pellet as claimed in claim 3 wherein said second layer comprises an iodine value of less than 10.

5. The pellet as claimed in claim 1 comprising a minimum SFI at 70 degrees Fahrenheit of 19% solids content.

6. The pellet as claimed in claim 1 comprising a minimum SFI at 104 degrees Fahrenheit of 16% solids content.

7. A method of forming a generally solid pellet of a vegetable oil or shortening solid comprising:
   extruding a length of a first solid vegetable oil or shortening having a first melting point,
   coating said length of said first solid with a liquid comprising a second vegetable oil or shortening said liquid having a melting point higher than said first melting point, and
   allowing said liquid to solidify to form a solid layer about said first solid vegetable oil or shortening.

8. The method as claimed in claim 7 wherein said liquid comprises a melting point of between 95 to 120 degrees Fahrenheit.

9. The method as claimed in claim 7 wherein said liquid comprises a melting point of greater than 120 degrees Fahrenheit.

10. The pellet as claimed in claim 9 wherein said liquid comprises an iodine value of less than 10.

11. The method as claimed in claim 7 wherein said formed pellet comprises a minimum SFI at 70 degrees Fahrenheit of 19% solids content.

12. The method as claimed in claim 7 wherein said formed pellet comprises a minimum SFI at 104 degrees Fahrenheit of 16% solids content.

13. A method of forming a generally solid pellet of a vegetable oil or shortening solid comprising:
   extruding a length of a first solid vegetable oil or shortening having a first melting point from extruding voids in an extrusion apparatus,
   inserting said length into a void having a diameter greater than the diameter of said extruding void,
   injecting a liquid comprising a second vegetable oil or shortening into said void said liquid having a melting point higher than said first melting point,
   coating said first solid with said liquid,
   subdividing said first solid length into a desired length, and
   allowing said liquid to solidify to form a solid layer.

14. The method as claimed in claim 13 wherein said liquid comprises a melting point of between 95 to 120 degrees Fahrenheit.

15. The method as claimed in claim 13 wherein said liquid comprises a melting point of greater than 120 degrees Fahrenheit.

16. The pellet as claimed in claim 15 wherein said liquid comprises an iodine value of less than 10.

17. The method as claimed in claim 13 wherein said formed pellet comprises a minimum SFI at 70 degrees Fahrenheit of 19% solids content.

18. The method as claimed in claim 13 wherein said formed pellet comprises a minimum SFI at 104 degrees Fahrenheit of 16% solids content.

* * * * *